United States Patent Office 3,326,936
Patented June 20, 1967

3,326,936
PREPARATION OF 2,4-ALKADIENOIC ACID AND INTERMEDIATES THEREFOR
Robert P. Allingham, Groton, Conn., assignor to Chas. Pfizer & Co., Inc., New York, N.Y., a corporation of Delaware
No Drawing. Filed June 24, 1964, Ser. No. 377,506
11 Claims. (Cl. 260—343.5)

This invention relates to a process for the preparation of dienoic acids possessing anti-microbial activity and more particularly, to the preparation of sorbic acid. The invention further relates to a novel intermediate from which sorbic acid is derived.

The over-all process may be considered as the transformation of an α-cyano-2,4-alkadienoic acid to the corresponding 2,4-alkadienoic acid which comprises a series of steps involving the manufacture of novel intermediates. Flow sheet 1 illustrates the processes and intermediates involved, shown below:

FLOW SHEET 1

α-cyano-2,4-alkadienoic acid A

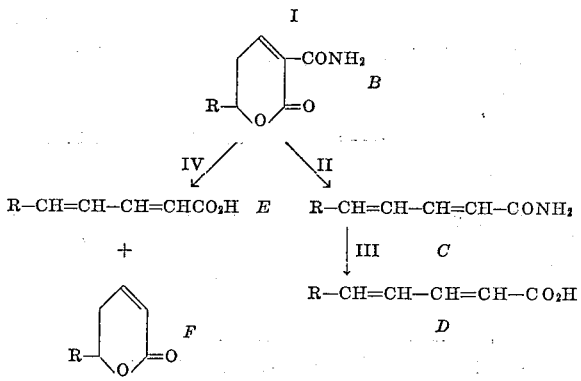

wherein R is alkyl of from 1 to 18 carbon atoms.

The processes described in the present invention are centered on the formation of a novel intermediate from which the products are derived, namely, α,β-unsaturated-Δ-lactone-α-carboxamide, denoted as compound B in Flow Sheet 1. The aforesaid compound is prepared from the corresponding α-cyano-2,4-alkadienoic acid obtained by the basic condensation of α-cyanoacetic acid and the corresponding α,β-unsaturated aldehyde, wherein cyclization and partial hydrolysis take place simultaneously. Furthermore, the conditions for obtaining high yields of said lactone-amide are surprisingly narrow. The process comprises reacting an α-cyano-2,4-alkadienoic acid with sulfuric acid and water, said water in sufficient amount to provide up to about 4 moles of water per mole of said α-cyanoacid and said sulfuric acid being present in an amount to provide at least about 4 parts by weight per part of water and maintaining the reaction mixture at a temperature between about 50 and 125° C. until substantial conversion to said lactone has occurred.

In Step I, Flow Sheet 1, when R is methyl, α-cyanosorbic acid prepared by the basic condensation of cyanoacetic acid and crotonaldehyde is converted to 5,6-dihydro-6-methyl-2-oxo-2H-pyran-3-carboxamide. The sulfuric acid concentration as well as the water-cyanoacid ratio are critical factors in the aforementioned reaction. Although the above cited limits are preferable, an even more desirable range consists of sulfuric acid containing 7 to 10% by weight of water and providing 0.5 to 2.5 moles of water per mole of α-cyanoacid. Moreover, a temperature range of from about 70 to about 85° C. is more particularly preferred. In general, the aforesaid reaction process is easy, clean, and offers high yields of product.

The novel intermediate, α,β-unsaturated-Δ-lactone-α-carboxamide, serves as the foundation for ensuing reactions wherein useful products thereof are prepared. One such route, indicated by Step II in Flow Sheet 1, relates to the process for decarboxylating said intermediate to form the corresponding 2,4-alkadienoic acid amide, which comprises forming a mixture of said lactone-amide in a reaction-inert polar solvent with a catalyst selected from the group consisting of hydrocarbon tertiary amines, ammonia, ammonium and amine salts of mineral acids, and ammonium and amine salts of alkanoic acids of from 1 to 18 carbon atoms and maintaining said mixture at a temperature of from 80 to about 150° C. until substantial decarboxylation has occurred. By reaction-inert solvent is meant one which does not react with the starting compound or desired product. Suitable solvents are: water, acetic acid, butanol, ethanol, and the like.

A variety of inorganic and organic basic materials may be used as reaction catalysts, including hydrocarbon tertiary amines, like triethylamine, tripropylamine, tributylamine, pyridine, picoline, quinoline; ammonium and amine salts of mineral acids, like ammonium chloride and diethylammonium chloride; ammonium and amine salts of alkanoic acids, like ammonium acetate and diethylammonium acetate. Many related materials are also operable, as well as mixtures thereof.

In general, mixtures of all-trans and cis-trans-2,4-alkadienoic acid amides are obtained from the above described process. However, when the catalyst-solvent system is specifically one which consists of an alkanoic acid of from 2 to 12 carbon atoms as solvent, and a hydrocarbon tertiary amine as catalyst, the resulting 2,4-alkadienoic acid amide is the α,β-cis, γ,Δ-trans isomer. Hence, by choosing the appropriate reaction conditions, one may selectively prepare the desired 2,4-alkadienoic acid amide possessing a predictable configuration. For example, when 5,6-dihydro-6-methyl-2-oxo-2H-pyran-3-carboxamide is treated with an acetic acid-pyridine system, the resulting product is hexa-2-cis-4-trans-dienamide; however, when a water-triethylamine system is used, a mixture of all-trans and cis-trans-2,4-hexadienamides are produced.

The reaction mixture is usually heated at reflux, said temperature dependent on the boiling point of solvent used, for a period of 1 to about 5 hours.

Conveniently, the 2,4-alkadienoic acid amide may be converted to the corresponding 2,4-alkadienoic acid by subjecting said amide to a basic hydrolysis as shown by Step III in Flow Sheet 1. Said basic hydrolysis step consists of the addition of water to the partially dried amide, followed by the inclusion of an alkali metal hydroxide solution such as sodium or potassium hydroxide until the resultant mixture is basic, and subsequently stirring at reflux temperatures for about 1 to 3 hours. The reaction mixture is subsequently cooled, acidified, extracted with a suitable solvent, for example, chloroform, evaporated, and crystallized to give a sharp-melting solid.

In general, the 2,4-alkadienoic acid derived in this manner will retain the configuration of the original dienamide; however, when conditions are such that very strong aqueous alkali and high temperatures are used, i.e., at a temperature at least about 90° C., and a concentration of alkali metal hydroxide of from 20 to about 50%, the all-trans isomer is obtained regardless of the original configuration of the dienamide. For instance, under the latter conditions, a cis-trans dienamide will be converted to the all-trans dienoic acid.

A useful application of the aforesaid isomerization, is found in the preparation of sorbic acid wherein hexa-2-cis-4-trans-dienamide is converted to sorbic acid, the all-trans isomer of 2,4-hexadienoic acid.

Regarding Steps I, II, and III, it is not intended to imply that isolation of intermediates is required before the ensuing reaction is allowed to take place; indeed, it is possible and practical to convert either the α-cyanoacid or the α,β-unsaturated-Δ-lactone-α-carboxamide to the final 2,4-alkadienoic acid without isolation of intermediates. Essentially, one may visualize this as a combination of Steps I, II and III, and Steps II and III respectively.

Another related process disclosed herein for the preparation of sorbic acid, comprises heating 5,6-dihydro-6-methyl-2-oxo-2H-pyran-3-carboxamide in aqueous mineral acid at a temperature of from about 80 to 150° C. Basically, it consists of an acid hydrolysis step involving hydrolysis, decarboxylation and dehydration. Similarly, it is possible to avoid isolation of said lactone-amide by treating the mixture resulting from the reaction of α-cyanosorbic acid and sulfuric acid with water and subsequently heating at a temperature of from 80 to about 150 °C. until substantial conversion occurs. In addition to sorbic acid, sorbic acid lactone is always produced by the aforementioned process. Separation of products is effected by cooling the reaction mixture and filtering the crystalline sorbic acid. The sorbic acid lactone is subsequently obtained by extraction followed by distillation.

When an alcohol solvent is used in place of water, the corresponding sorbate ester is obtained by the same process. For instance, ethyl sorbate is obtained when ethyl alcohol is used as solvent.

The 2,4-alkadienoic acids, their amides, esters and corresponding lactones derived from the novel process disclosed in this invention possess anti-microbial activity. In particular, sorbic acid is known to exhibit this property.

The following examples are provided by way of illustration and should not be interpreted as limiting the invention, many variations of which are possible without departing from the spirit or scope thereof.

*Example I.—5,6-dihydro-6-methyl-2-oxo-2H-pyran-3-carboxamide*

Cyanosorbic acid (137 g., 1 M) is added portionwise with stirring to 236 ml. of 91.5% sulfuric acid. The mixture is then heated at 70° C. for 1 hour, at 75° C. for 1 hour and then at 80° C. for 1 hour, the total heating time being 4 hours. The mixture is then poured with good agitation into 1000 g. of ice and the resulting solution is stirred at 5° C. for 45 minutes and then filtered to give 65 g. of product. The mother liquor is extracted with 3 l. of chloroform in 4 portions and evaporation of the dry chloroform extract gives 73.9 g. of product. The yield of crystalline 5,6 - dihydro - 6 - methyl-2-oxo-2H-pyran-3-carboxamide from both portions represents a yield of approximately 90%, M.P. 136–137° C.

The aforesaid procedure is used to prepare the following α,β-unsaturated-Δ-lactone-α-carboxamides from corresponding α-cyano-2,4-alkadienoic acids in substantial amounts:

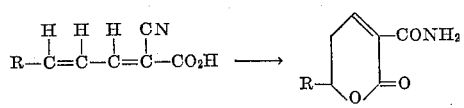

| R | α-Cyanoacid |
|---|---|
| $C_2H_5$ | $C_2H_5-CH=CH-CH=\overset{CN}{\underset{|}{C}}-CO_2H$ |
| $C_8H_{17}$ | $C_8H_{17}-CH=CH-CH=\overset{CN}{\underset{|}{C}}-CO_2H$ |
| $C_{12}H_{25}$ | $C_{12}H_{25}-CH=CH-CH=\overset{CN}{\underset{|}{C}}-CO_2H$ |
| $C_{18}H_{37}$ | $C_{18}H_{37}-CH=CH-CH=\overset{CN}{\underset{|}{C}}-CO_2H$ |

*Example II.—α,β-cis-γ,Δ-trans-hexadienamide*

Recrystallized 5,6-dihydro-6-methyl-2-oxo-2H-pyran-3-carboxamine (15.5 g., 0.1 M) is mixed with 100 ml. of glacial acetic acid containing 1 ml. of pyridine and the mixture is heated under reflux for 2 hours. Evaporation of the mixture affords high yields of α,β-cis,γ,Δ-trans-hexadienamide.

*Example III.—α,β-cis-γ,Δ-trans-hexadienamide*

In the same manner as disclosed in Example II, α,β-cis, γ,Δ-trans-hexadienamide is prepared in substantial yield, utilizing a stoichiometric equivalent of triethylamine in lieu of pyridine of Example II.

*Example IV.—α,β-cis-γ,Δ-trans-hexadienamide*

In the same manner as disclosed in Example II, α,β-cis, γ,Δ-trans-hexadienamide is prepared in substantial yield utilizing propionic acid in lieu of acetic acid of Example II.

*Example V.—α,β-cis-γ,Δ-trans-alkadienamide*

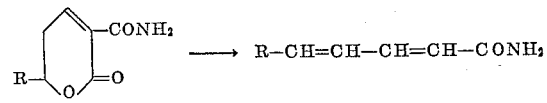

In the same manner as disclosed in Example II, the following α,β-cis,γ,Δ-trans-alkadienamides are prepared in good yields from corresponding α,β-unsaturated-Δ-lactone-α-carboxamides:

| R | α,β-cis, γ,Δ-trans-alkadienamide |
|---|---|
| $C_2H_5$ | $C_2H_5-CH=CH-CH=CH-CONH_2$ |
| $C_8H_{17}$ | $C_8H_{17}-CH=CH-CH=CH-CONH_2$ |
| $C_{12}H_{25}$ | $C_{12}H_{25}-CH=CH-CH=CH-CONH_2$ |
| $C_{18}H_{37}$ | $C_{18}H_{37}-CH=CH-CH=CH-CONH_2$ |

*Example VI.—2,4-hexadienamide*

A solution containing 5,6-dihydro-6-methyl-2-oxo-2H-pyran-3-carboxamide (15.5 g., 0.1 M), water (100 ml.), and pyridine (1 ml.) is heated at reflux for 2 hours to afford upon evaporation, a mixture of all-trans and cis-trans-2,4-hexadienamides in good yields.

*Example VII.—2,4-hexadienamide*

In the same manner as disclosed in Example VI, a mixture of all-trans and cis-trans-2,4-hexadienamides is prepared in substantial yield utilizing ammonium chloride in lieu of pyridine of Example VI.

*Example VIII.—2,4-hexadienamide*

In the same manner as disclosed in Example VI, a mixture of all-trans and cis-trans-2,4-hexadienamides is prepared using butanol in lieu of water of Example VI.

*Example IX.—2,4-hexadienamide*

In the same manner as disclosed in Example VI, the following mixtures of all-trans and cis-trans-2,4-alkadienamides are prepared from corresponding α,β-unsaturated-Δ-lactone-α-carboxamides in good yield as shown below:

| R | Alkadienamide (all-trans and cis-trans mixtures) |
|---|---|
| $C_2H_5$ | $C_2H_5-CH=CH-CH=CH-CONH_2$ |
| $C_8H_{17}$ | $C_8H_{17}-CH=CH-CH=CH-CONH_2$ |
| $C_{12}H_{25}$ | $C_{12}H_{25}-CH=CH-CH=CH-CONH_2$ |
| $C_{18}H_{37}$ | $C_{18}H_{37}-CH=CH-CH=CH-CONH_2$ |

*Example X.—α,β-cis,γ,Δ-trans-hexadienamide*

α-Cyanosorbic acid is treated as in Example I, however, the resulting solution is quenched with glacial acetic acid in lieu of water. Sufficient pyridine to neutralize the sulfuric acid is then added, and the mixture is treated as in Example II to afford good yields of α,β-cis,γ,Δ-trans-hexadienamide.

*Example XI.—2,4-hexadienamide*

In the same manner as disclosed in Example X, mixtures of all-trans and cis-trans-2,4-hexadienamides are prepared in substantial yield using water as quenching medium in lieu of glacial acetic acid.

*Example XII.—Sorbic acid*

5,6 - dihydro - 6 - methyl - 2 - oxo - 2H - pyran - 3-carboxamide (7.75 g., 0.05 M) is mixed with 102.9 ml. of acetic acid and 4 ml. of pyridine and the reaction mixture is heated under reflux for 2¼ hours. The mixture is then evaporated nearly to dryness, mixed with 45 ml. of water, and 63 ml. of 60% potassium hydroxide and heated under reflux for 1¾ hours. Acidification and extraction with chloroform of the reaction mixture gives 4.4 g. (78.6%) of sorbic acid, M.P. 107–121° C. Recrystallization affords sorbic acid, M.P. 129–132° C.

*Example XIII.—α,β-trans-γ,Δ-trans-alkadienoic acid*

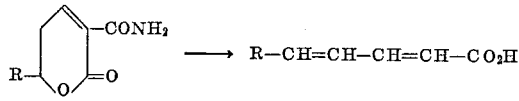

$\longrightarrow R-CH=CH-CH=CH-CO_2H$

The experiment of Example XII is repeated except as noted below, and products are again prepared in good yield:

| R | α,β-trans-γ,Δ-trans alkadienoic acid |
|---|---|
| $C_2H_5$ | $C_2H_5-CH=CH-CH=CH-CO_2H$ |
| $C_8H_{17}$ | $C_8H_{17}-CH=CH-CH=CH-CO_2H$ |
| $C_{12}H_{25}$ | $C_{12}H_{25}-CH=CH-CH=CH-CO_2H$ |
| $C_{18}H_{37}$ | $C_{18}H_{37}-CH=CH-CH=CH-CO_2H$ |

*Example XIV.—α,β-trans-γ,Δ-trans-alkadienoic acid*

Sorbic acid and other α,β-trans-γ,Δ-trans alkadienoic acids described herein are prepared in substantial yield from corresponding α-cyanoacids incorporating the procedures of Examples I and XII respectively without isolation of the intermediate produced in Example I.

*Example XV.—Sorbic acid and sorbic acid lactone*

Cyanosorbic acid (274 g., 2 M) is added portionwise with stirring to 473 ml. of 91% sulfuric acid. The mixture is then heated at 70° C. for 1 hour, at 75° C. for 1 hour and at 80° C. for 1 hour and then poured into 2 liters of water and heated under reflux for 5 hours. The solution is cooled and the crystalline sorbic acid is removed by filtration. The filtrate is extracted with chloroform, and the organic phase is stripped and fractionally distilled to yield sorbic acid lactone. Yields of both products are substantial.

The aforementioned products may be prepared from 5,6-dihydro-6-methyl-2-oxo-2H-pyran-3-carboxamide by a similar procedure wherein sulfuric acid and water are added and the reaction mixture treated as above.

*Example XVI.—Sorbic acid ester*

Following the procedure of Example XV, ethyl sorbate is prepared utilizing ethanol in lieu of water as solvent. Subsequent work-up is characterized by extraction of the reaction mixture with chloroform, evaporation and fractional distillation to afford substantial yields of ethyl sorbate.

Similarly, the methyl, butyl, and octyl esters are prepared by substituting the appropriate alcohol in this procedure.

What is claimed is:

1. A process for the preparation of a 2,4-alkadienoic acid which comprises reacting an α-cyano-2,4-alkadienoic acid with sulfuric acid and water, said water in sufficient amount to provide up to about 4 moles of water per mole of said α-cyanoacid and said sulfuric acid being present in an amount to provide at least about 4 parts by weight per part of water and maintaining the reaction mixture at a temperature between about 50 and 125° C. for a period of from ½ to 5 hours, and subsequently combining said reaction mixture with a reaction-inert polar solvent containing a catalyst selected from the group consisting of hydrocarbon tertiary amines, ammonia, ammonium and amine salts of mineral acids, and ammonium and amine salts of alkanoic acids of from 1 to 18 carbon atoms, said catalyst present in at least sufficient amount to neutralize the sulfuric acid, maintaining said combined mixture at a temperature of from 80 to about 150° C. until substantial decarboxylation has occurred, evaporating said solvent, and subsequently subjecting said decarboxylated mixture to a basic hydrolysis.

2. The process for converting an α-cyano-2,4-alkadienoic acid to the coresponding α,β-unsaturated-Δ-lactone-α-carboxamide, which process comprises reacting an α-cyano-2,4-alkadienoic acid with sulfuric acid and water, said water in sufficient amount to provide up to about 4 moles of water per mole of said α-cyanoacid and said sulfuric acid being present in an amount to provide at least about 4 parts by weight per part of water and maintaining the reaction mixture at a temperature between about 50 and 125° C. for a period of from ½ to 5 hours.

3. The process of claim 2 wherein α-cyanosorbic acid is converted to 5,6-dihydro-6-methyl-2-oxo-2H-pyran-3-carboxamide.

4. Compounds having the formula:

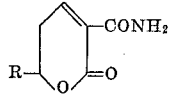

wherein R is alkyl of from 1 to 18 carbon atoms.

5. 5,6 - dihydro - 6 - methyl - 2 - oxo - 2H - pyran-3-carboxamide.

6. The process for decarboxylating an α,β-unsaturated-Δ-lactone-α-carboxamide to form the corresponding 2,4-alkadienoic acid amide, which process comprises forming a mixture of said lactone-amide in a reaction-inert polar solvent with a catalyst selected from the group consisting of hydrocarbon tertiary amines, ammonia, ammonium and amine salts of mineral acids, and ammonium and amine salts of alkanoic acids of from 1 to 18 carbon atoms and maintaining said mixture at a temperature of from about 80 to about 150° C. until substantial decarboxylation has occurred.

7. A process as in claim 6 for the preparation of an α,β - cis - γ,Δ-trans-2,4-alkadienoic acid amide wherein said solvent is an alkanoic acid of from 2 to 12 carbon atoms, and said catalyst is a hydrocarbon tertiary amine.

8. The process of claim 6 wherein 5,6-dihydro-6-methyl-2-oxo-2H-pyran-3-carboxamide is converted to hexa-2,4-dienamide.

9. The process of claim 7 wherein 5,6-dihydro-6-methyl-2-oxo-2H-pyran-3-carboxamide is converted to hexa-2-cis-4-trans-dienamide.

10. A process as in claim 1 for the preparation of a 2-trans-4-trans-alkadienoic acid from the corresponding α-cyano-2,4-alkadienoic acid wherein said basic hydrolysis is conducted at a temperature at least about 90° C. and a concentration of alkali metal hydroxide of from 20 to about 50%.

11. A process as in claim 10 wherein sorbic acid is prepared from α-cyanosorbic acid.

References Cited

UNITED STATES PATENTS 3,122,557    2/1964    Molho _____ 260—295

FOREIGN PATENTS 813,844    6/1937    France.

OTHER REFERENCES

Kroper, Houben-Weyl: Methoden der Organischen Chemie, page 783 (1963).

Wagner et al., Synthetic Organic Chemistry, pp. 415, 534, 535, 480 (1953).

ALEX MAZEL, *Primary Examiner.*

JOSEPH A. NARCAVAGE, *Assistant Examiner.*